Patented Sept. 18, 1934

1,974,028

UNITED STATES PATENT OFFICE 1,974,028

PROCESS FOR THE BAKING OF BREAD

Ernst Komm, Dresden, Germany, assignor to the firm Theodor Schlüter sen., of Dresden A., Germany No Drawing. Application August 20, 1932, Serial No. 629,757. In Germany August 27, 1931

9 Claims. (Cl. 99—10)

In the normal production of bread, it is generally customary to use sour dough as the raising agent. Sour doughs, being mixtures of fermenting cultures, have, apart from their action as raising agents, a preserving effect and they introduce into the bread the typical flavouring and aromatic substances, such for example as are contained in rye-bread.

The sour dough process, is, however, well known to be wasteful of time and it requires a considerable practical experience in the preparation and use of the leaven if the finished bread is to be of good flavour, aromatic and sightly.

Consequently numerous proposals have already been made to bake coarse bread, without using sour dough, with yeast in the same manner as is customary for wheaten bread, particularly small baked goods. Thus it has already been suggested to bake bread with the aid of yeast and an addition of acid inorganic acids or of lactic acid. Apart from technical deficiencies which may easily arise in respect of the shape and internal properties of the bread, breads produced in the aforesaid manner also lack the flavouring and aromatic substances upon which good flavour depends. Such breads taste stalely of yeast and sometimes even have a strongly bitter after-taste. In any case they have not the bread flavour required by the public.

In a long series of experiments, the inventor has now discovered that these deficiencies can be overcome, and that it is possible, when baking without sour dough and employing any auxiliary baking agents or raising agents, to obtain quite a normal aromatic bread of good flavour, if small quantities of an acid, of low molecular weight, of the fatty acid series are added to the paste mixture as well as lactic acid, which by itself alone does not possess this advantageous effect and which is not claimed per se. Present experience suggests that propionic acid is particularly good for the purpose. If, for example, quite small quantities of such organic acids, e.g. 1% or less calculated upon the flour, are added to a baking paste containing additions of yeast and lactic acid, then finished breads are obtained which exhibit the typical bread flavour and bread aroma in a normally well developed condition and which also in appearance do not differ from a normal bread baked with sour dough. The higher homologues of acetic acid act in the same fashion. From experience hitherto gained, acids having up to 8 atoms of carbon are particularly suitable.

It has already been proposed to employ organic acids, not for baking, but for preparing a glutinous soft flour, unsuitable for baking, in mixture with phosphorous halogen compounds, e. g. phosphorous pentachloride. This prior process is carried out by conducting a moistened inert gas over a mixture of phosphorous pentachloride with small quantities of an organic acid. In this fashion, the mixture enters into reaction, and peroxides are formed from the acid used with the simultaneous evolution of phosphorous pentoxide and hydrochloric acid, said peroxides serving as oxygen carriers for hardening the soft gluten in the flour over which the moistened gas loaded with oxygen or with organic peroxides is conducted. Consequently no trace of organic acid enters the flour so treated.

In contradistinction to breads which are baked simply, for example, with pressed yeast and an addition of lactic acid, the breads which are obtained, for instance, with an addition of propionic acid to the paste not only exhibit the typical bread flavour and the required bread aroma, but also possess the required uniform and good porosity, the necessary volume and closed surface as exhibited by normal bread leavened with sour dough.

In place of or as well as the fatty acids, their esters may also be added to the bread. In this connection, reference may be made especially to the methyl, ethyl, butyl and amyl esters of the homologues of low molecular weight of acetic acid. The esters must be added to the bread, if, as raising agent use is made not of yeast but of baking powder, because then the fermentation alcohols are lacking, and consequently no esters can be formed with the fatty acid added.

Examples of compositions of paste in accordance with the invention are given below:—

I. With 3500 grms. of rye-flour and 30 grms. of yeast is mixed 2000 c. c. of water to which 25 c. c. of 80% lactic acid, 2 c. c. of propionic acid and 30 grms. of salt has been added. This is worked to a paste in the usual manner, allowed to swell and baked.

The quantity of fatty acid to be added may vary in accordance with the composition and with the requirements of local taste which in Germany are different in different districts. Referred to the dry flour said quantity may vary between about 0.2% and 1%.

II. With 3500 grms. of rye flour and 30 grms. of yeast is mixed 2000 c. c. of water to which 25 c. c. of 80% lactic acid, 2 c. c. of propionic acid, 0.3 c. c. of caproic acid and 30 grms. of salt has been added. This is worked to a paste in the usual manner, allowed to swell and baked.

III. Proceeding as in Example I, use is made however, in place of the yeast, of a sufficient quantity of baking powder and, in place of 2 c. c. of propionic acid, of about 3.2 c. c. of a carboxylic ester, e. g. propionic ethyl ester.

IV. 3500 grms. of flour.
  2000 grms. of water.
  71 c. c. of 80% edible lactic acid.
  35 grms. of bicarbonate as baking powder.
  0.5 c. c. of propionic ethyl ester.
  0.5 c. c. of butyric methyl ester.
  Salt to taste.

V. 3500 grms. of flour.
  2000 grms. of water.
  66 c. c. of 80% edible lactic acid.
  1 c. c. of conc. propionic acid.
  5 c. c. of conc. acetic acid.
  0.5 c. c. of butyric ethyl ester.
  0.2 c. c. of isovalerianic ethyl ester.
  35 grms. of bicarbonate as baking powder.
  Common salt to taste.

What I claim is:—

1. A process of making rye and mixed breads which comprises preparing a dough containing flour substantially free from gluten forming substances, a raising agent selected from the group consisting of yeast and baking powders, lactic acid, and a compound selected from the group consisting of fatty acids of low molecular weight having not more than 8 carbon atoms and their aliphatic esters, and baking the dough thus prepared.

2. A process of making rye and mixed breads which comprises preparing a dough containing flour substantially free from gluten forming substances, a raising agent selected from the group consisting of yeast and baking powders, lactic acid, and propionic acid, and baking the dough thus prepared.

3. A process of making rye and mixed breads which comprises preparing a dough containing flour substantially free from gluten forming substances, a raising agent selected from the group consisting of yeast and baking powders, lactic acid, and a higher homologue of acetic acid of low molecular weight, and baking the dough thus prepared.

4. A process of making rye and mixed breads which comprises preparing a dough containing flour substantially free from gluten forming substances, a raising agent selected from the group consisting of yeast and baking powders, lactic acid, and an esterified aliphatic higher homologue of acetic acid of low molecular weight, and baking the dough thus prepared.

5. A process of making rye and mixed breads which comprises preparing a dough containing flour substantially free from gluten forming substances, yeast, lactic acid, and propionic acid, and baking the dough thus prepared.

6. A process of making rye and mixed breads which comprises preparing a dough containing flour substantially free from gluten forming substances, a baking powder, lactic acid, and a carboxylic aliphatic ester of a fatty acid having not more than 8 carbon atoms, and baking the dough thus prepared.

7. A process of making rye and mixed breads which comprises preparing a dough containing flour substantially free from gluten forming substances, a baking powder, lactic acid, and propionic ethyl ester, and baking the dough thus prepared.

8. A process of making rye and mixed breads which comprises preparing a dough containing flour substantially free from gluten forming substances, a raising agent selected from the group consisting of yeast and baking powders, lactic acid, and 0.2% to 1.0% of propionic acid, and baking the dough thus prepared.

9. A process of making rye and mixed breads which comprises preparing a dough containing flour substantially free from gluten forming substances, a raising agent selected from the group consisting of yeast and baking powders, lactic acid, and 0.2% to 1.0% of a higher homologue of acetic acid of low molecular weight, and baking the dough thus prepared.

ERNST KOMM.